Dec. 30, 1952 — E. J. VON PEIN — 2,623,706
FISHING REEL
Filed Oct. 7, 1947 — 5 Sheets-Sheet 1

INVENTOR.
EDWARD J. VON PEIN
BY
ATTORNEY

Dec. 30, 1952     E. J. VON PEIN     2,623,706
FISHING REEL

Filed Oct. 7, 1947     5 Sheets-Sheet 3

INVENTOR.
EDWARD J. VON PEIN
BY
ATTORNEY

Dec. 30, 1952 E. J. VON PEIN 2,623,706
FISHING REEL

Filed Oct. 7, 1947 5 Sheets-Sheet 4

INVENTOR.
EDWARD J. VON PEIN
BY
Edward Reed
ATTORNEY

Patented Dec. 30, 1952

2,623,706

UNITED STATES PATENT OFFICE 2,623,706

FISHING REEL

Edward J. Von Pein, Dayton, Ohio

Application October 7, 1947, Serial No. 778,497

18 Claims. (Cl. 242—84.6)

This invention relates to a fishing reel and one object of the invention is to provide a reel of the so called "free spool" type in which the means for connecting the spool with and disconnecting the same from the driving shaft may be operated from either side of the reel.

A further object of the invention is to provide a reel in which the spool rotates about the axis of the driving shaft and the connection between the spool and the shaft is controlled by the shaft.

A further object of the invention is to provide a reel in which a connecting element controlled by the driving shaft is automatically locked in either clutching position or declutching position.

A further object of the invention is to provide a reel in which the spool is so mounted on the driving shaft that it may be rotated thereby or may rotate with relation thereto against the action of a frictional resistance, and in which the resistance may be adjusted by a device mounted on said shaft.

A further object of the invention is to provide a reel in which the spool rotates about the driving shaft and is frictionally connected with a member mounted on and rotatable with the shaft and which member may be locked against rotation in line unwinding direction.

Other objects of the invention may appear as the reel is described in detail.

In the accompanying drawings

In these drawings I have illustrated one embodiment of my invention, together with a modification thereof, but it is to be understood that the reel as a whole, as well as the several parts thereof, may take various forms and may be assembled in various ways without departing from the spirit of the invention.

Figures 4, 5:
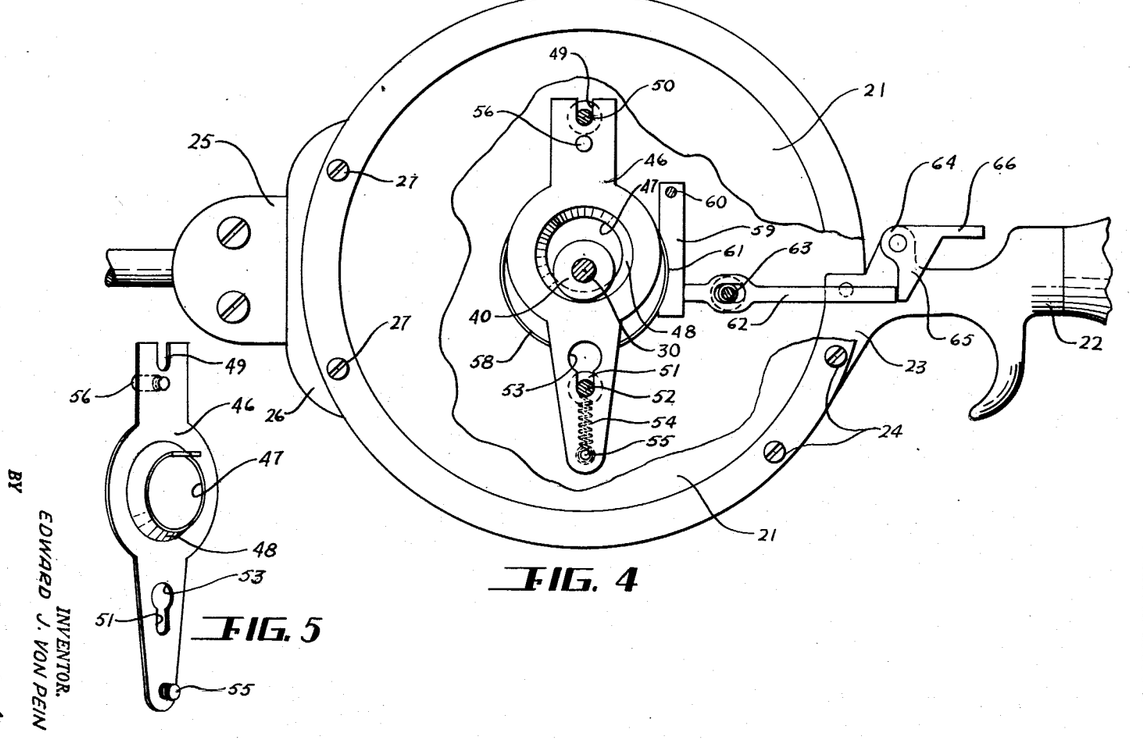
Fig. 4 is a side elevation of the reel, partly broken away, to show the locking device for one of the clutch members.
Fig. 5 is a perspective view of the locking device.

In the embodiment here illustrated the reel comprises a circular frame including side members 20 and 21 having their marginal portions bent inwardly and then radially. These side walls may be connected one with the other in any suitable manner, and as shown more particularly in Fig. 4, a rod handle 22 is provided with an arcuate portion 23 arranged between the marginal portions of the two side members on one side of the center thereof and connected thereto, as by screws 24. On the other side of the center of the frame a rod attaching device 25 has a part 26 extending between the marginal portions of the side members and rigidly secured thereto, as by screws 27. The side members are provided with alined bearings 28 and 29. A drive shaft 30 is mounted in the bearings 28 and 29 for both rotary movement and axial movement. The shaft extends beyond both bearings and has secured to each end thereof an actuating member, such as a crank handle 31, by either of which both movements of the shaft may be imparted thereto.

Figures 1, 2, 3, 6, 7, 8:
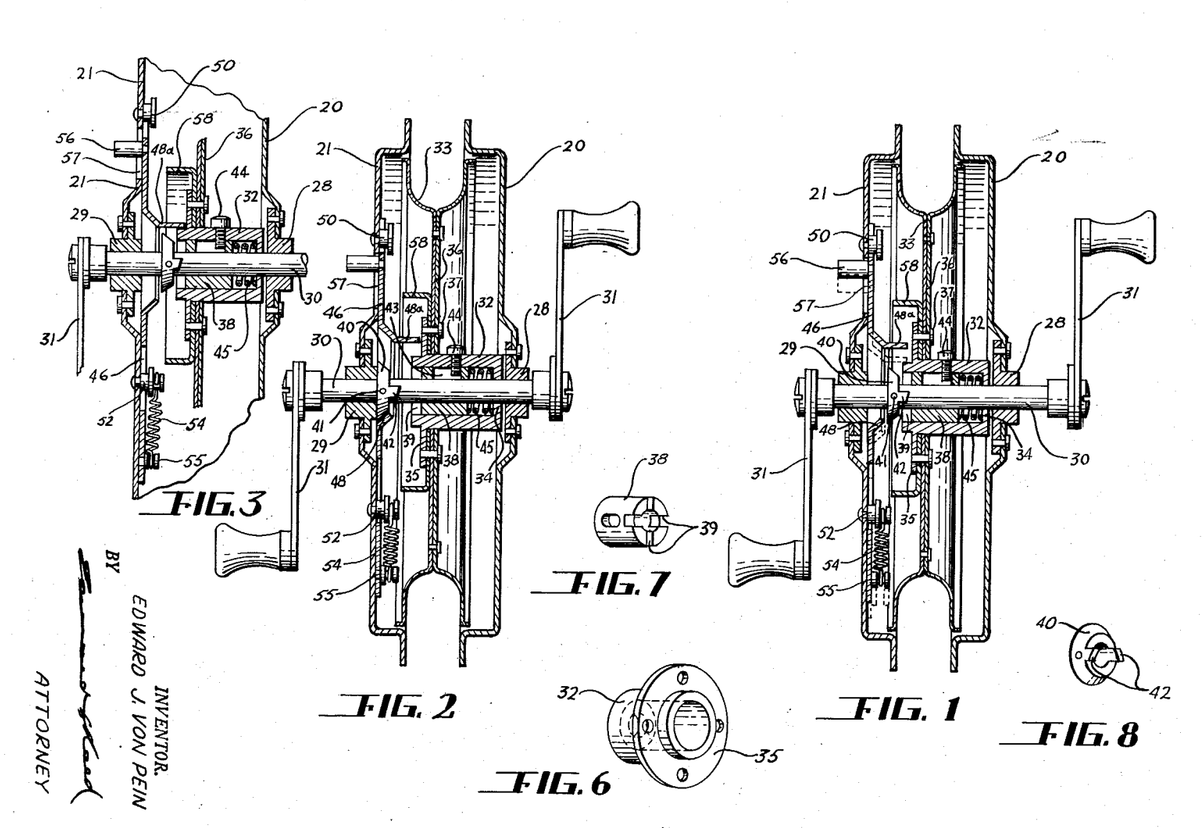
Fig. 1 is a section taken centrally through a reel embodying the invention and showing the spool connected with the shaft for rotation thereby.
Fig. 2 is a similar view showing the spool disconnected from the driving shaft.
Fig. 3 is a similar section, partly broken away, and showing the locking device in intermediate position.
Fig. 6 is a perspective detail view of the tubular member with which the spool is connected.
Fig. 7 is a perspective detail of a clutch member connected with the spool.
Fig. 8 is a perspective view of a clutch member carried by the shaft.

A tubular member 32 is rotatably supported on the shaft between the side members of the frame and a spool 33 is connected with the tubular member for rotation therewith. In that form of the invention shown in Figs. 1 to 8 the tubular member 32 is of an internal diameter greater than the diameter of the shaft and has adjacent the bearing 28 an end wall 34 provided with an opening to receive the shaft 30. Adjacent its other end the tubular member has an outwardly extending radial flange 35 to which the web portion 36 of the spool 33 is connected, as by screws or rivets 37. The means for connecting the shaft 30 with and for disconnecting the same from the tubular member 32 and the spool 33 may take various forms. As shown in Figs. 1 and 2 a collar or clutch member 38 is mounted about the shaft 30, connected with the tubular member 32 and provided adjacent the open end of the tubular member with notches or recesses 39. A second clutch member 40 is rigidly secured to the shaft 30, as by a pin 41, and is provided with projections or jaws 42 which are movable by the shaft 30 into and out of the recesses 39 of the clutch member 38. Preferably the clutch member 33 is provided between its ends with a slot 43 into which extends the end of a screw 44 which is threaded into the tubular member 32, thus permitting a limited axial movement of the clutch member with relation to the tubular member while causing the two members to rotate in unison. A spring 45 confined between the clutch member 38 and the end wall 34 of the tubular member urges the clutch member to the outer limit of its movement, in which position the recessed end thereof is at or close to the adjacent end of the tubular member. Thus if the jaws of the clutch member 40, when moved toward clutching position by the axial movement of the shaft 30, engage the face of clutch member 38 between the recesses therein the clutch member 38 will yield to permit the clutch member 40 to complete its movement and when the rotation of the shaft has moved the jaws into line with the recesses of clutch member 38 the spring will force that clutch member outwardly into interlocking connection with the jaws of clutch member 40. When the clutch member 40 is in clutching engagement with the clutch member 38 the spool is connected with the shaft for rotation therewith and the fisherman controls the winding in and paying out of the line through the handles 31. When the clutch member 40 is in declutching position the shaft has no control over the spool and the latter is free to rotate and pay out the line, as in casting. If after a cast, a fish strikes the lure the fisherman can quickly connect the shaft with the spool by actuating one of the handles to impart axial movement to the shaft to clutch the latter to the spool, and at the same time he may rotate the shaft to bring the clutch jaws 42 into line with the clutch recesses 39.

It is desirable that the clutch member 40 be locked in both its clutching and declutching positions to avoid the possibility of the clutch member being inadvertently moved during the rotation of the shaft, and it is also desirable that the means for locking the clutch member in declutching position should be such that the clutch member can be quickly released for movement to clutching position, as by an inward thrust on the shaft. For this purpose there is mounted on the frame a clutch controlling device which, as shown more particularly in Figures 4 and 5, comprises an elongate plate 46 slidably mounted on the side member 21, extending across the shaft 30 and having an opening 47 through which the shaft 30 extends, and also having a part which is movable into the path of movement of the clutch member 40 from either its clutching position or its declutching position. In the arrangement shown this part of the controlling device is in the nature of an inclined lip 48 which extends completely about the opening 47, that portion of the plate in which the opening is formed being pressed inwardly to frustro-conical shape with the opening in the inner portion thereof. In the arrangement shown the plate 46 is provided at its upper end with a slot 49 through which extends a headed stud 50, which is rigidly secured to the side member 21. Below the shaft 30 the plate is provided with a slot 51 through which extends a headed stud 52 also rigidly secured to the side member 21, the slot being provided at its upper end with an enlargement 53 to permit the plate to be moved over the head of the stud in assembling or disassembling the device. A coiled spring 54 is connected at its upper end with the stud 52 and at its lower end with a stud 55 secured to the lower end portion of the plate 46 and tends to move the plate upwardly to the limit of its movement, in which position the lip 48 is in the path of the clutch member 40 regardless of whether the clutch member is in clutching or declutching position. When the clutch member 40 is in declutching position the pressure of the same against the inclined lip 48 will force that lip downwardly against the action of the spring 54 and thus release the clutch member for movement to clutching position. Preferably the clutch member 40 is provided with an inclined peripheral surface corresponding to the inclination of the lip 48 to facilitate the movement of the lip by the clutch member. When the clutch member 40 is in clutching position, as shown in Fig. 1, the lip 48 will be in line with clutch member on the outer side thereof. To release the clutch member for movement from clutching position to declutching position the controlling plate is manually moved against the action of the spring 29 and for this purpose is provided with an actuating member, such as a pin 56 rigidly secured to the plate and extending through a slot 57 in the side wall 21. A finger 48a projects inwardly from the frustro-conical lip 48 above the shaft and serves to hold the tubular member 32 against axial movement and to also limit the downward movement of the plate so as to prevent it being moved manually far enough to disengage it from the stud 50. This engagement of the finger 48 with the tubular member also has a braking action which enables the fisherman to utilize the same to retard the paying out of the line.

For the purpose of enabling the fisherman to control the unwinding of the line when the spool is disconnected from the shaft there is provided a thumbing brake similar to that shown in my pending application for patent Serial Number 736,381, filed March 21, 1947, now abandoned. This brake comprises a brake drum 58 rigidly secured to the spool and in the present instance having its radial portion interposed between the web 36 of the spool and the flange 35 of the tubular member, and secured thereto by the screws 37. A brake shoe 59 is pivotally mounted on the frame at 60 and has a curved braking surface 61 to engage the brake drum. An actuating bar 62 is slidably supported on a stud 63 with its inner end in engagement with the brake shoe 59 and with its outer end extending through the peripheral wall of the side member 21 of the frame. A lever 64 pivotally mounted on the rod handle 22 has an arm 65 engaging the outer end of the actuating bar 62 and also has a thumb piece 66 arranged to be engaged by the thumb of the hand that grasps the handle, thus enabling the fisherman to accurately control the braking action on the spool.

Figures 9, 10, 11, 12, 13, 14, 15:
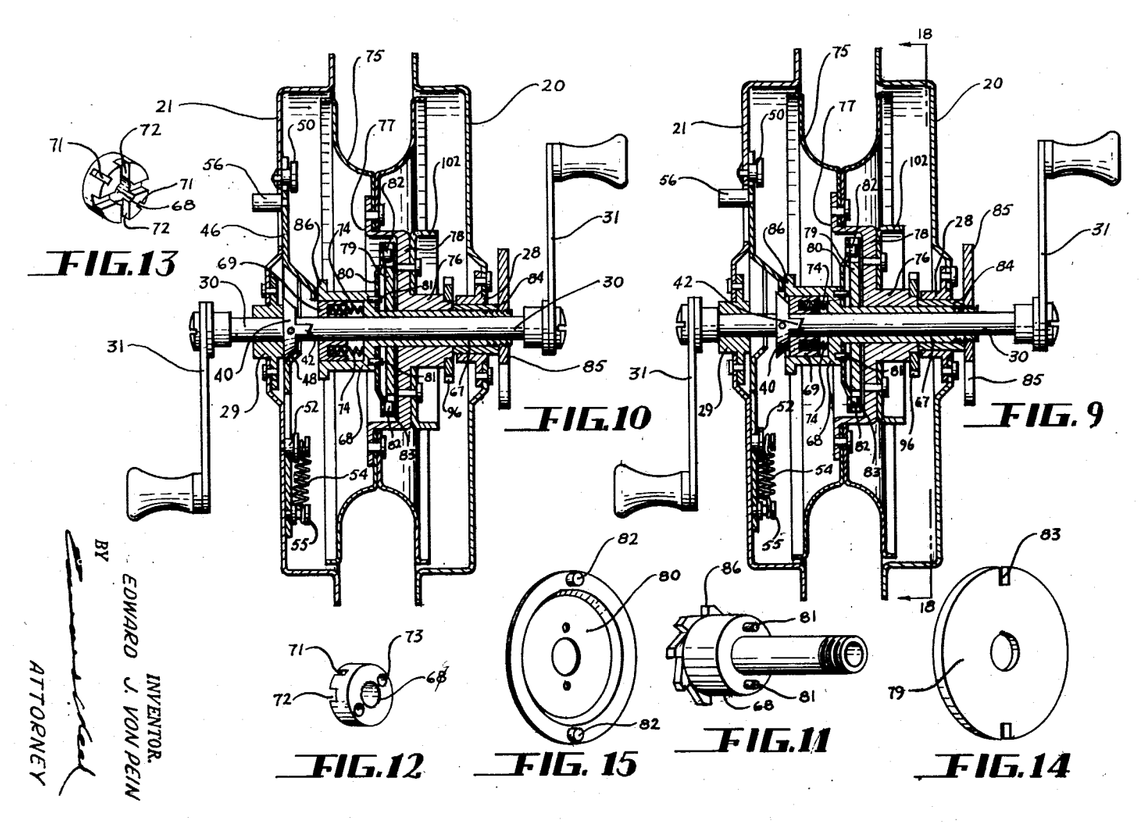
Fig. 9 is a sectional view taken centrally through a modified form of the invention showing the spool connected with the shaft.
Fig. 10 is a similar section showing the spool disconnected from the shaft.
Fig. 11 is a perspective view of the tubular member of Fig. 9.
Fig. 12 is a perspective detail of the clutch member connected with the tubular member.
Fig. 13 is a perspective detail of the clutch member viewed from the other side.
Fig. 14 is a perspective detail of a friction disk.
Fig. 15 is a perspective view of the resilient disk which exerts pressure on the friction disk.
Figures 18, 19:
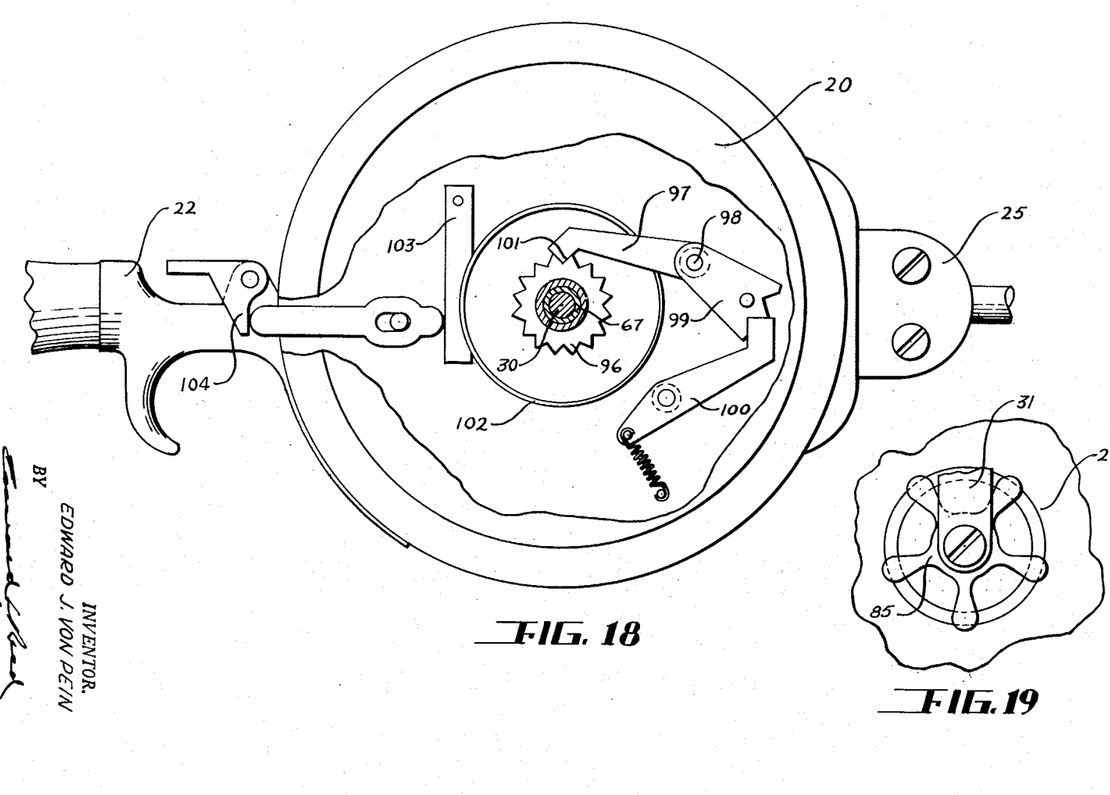
Fig. 18 is a side elevation of the reel of Fig. 9 partly broken away and looking in the direction of the arrows 18—18.
Fig. 19 is an elevation of a portion of the right hand side of the reel of Fig. 9.

In that form of the invention shown in Figs. 9 and 10 the frame structure, the shaft, the clutch member on the shaft and the clutch controlling device are substantially the same as those shown in Figs. 1 and 2, except that the frame is of greater width to receive a larger spool. In the construction shown in these figures the tubular member has a relatively long small diameter portion 67 and a shorter large diameter portion 68. A collar or clutch member 69 is rotatably supported upon the shaft and is connected with the tubular member by a screw 70 extending through the circumferential wall of the large diameter part 68 and into a groove 71 in the exterior surface of the clutch member 69, as shown in Fig. 13. The clutch member is provided on its outer face with recesses or notches 72 and in its rear face with sockets 73 in which are supported springs 74 which yieldably retain the clutch member in its normal clutching position. The spool 75 is carried by a hub 76 rotatably mounted on the small diameter portion of the tubular member. In the present instance the web of the spool is connected with a flange 77 offset with relation to the body of the hub 76. The radial portion of the hub 76 constitutes a portion of a friction clutch and has a friction surface 78 with which cooperates a friction disk 79 loosely supported on the tubular member for movement toward and from the hub. A disk spring 80 is mounted about the tubular member and is secured at its inner end to a large diameter portion thereof, as by studs 81. Lugs 82 secured to the outer portion of the disk spring extend into slots 83 in the peripheral portion of the friction disk 79. Thus the friction disk is connected with the tubular member for rotation therewith and exerts pressure on the friction surface of the hub to yieldably resist the rotation of the spool with relation to the tubular member. The extent of the frictional resistance so offered to the rotation of the spool is manually controlled. In the arrangement here shown a bushing 84 is rotatably mounted in the bearing 28 and the small diameter portion of the tubular member is rotatably mounted in that bushing. The outer end of the tubular member extends beyond the bushing and is screw threaded to receive an adjusting nut, here shown as a star wheel 85, see Fig. 19, the inner end of the bushing being in contact with the hub 76 and the star wheel in contact with the outer end of the bushing. It is obvious that the rotation of the star wheel in one direction will move the tubular element toward the star wheel and thus increase the tension of the disk spring 80 and cause the friction disk 79 to exert increased pressure on the friction surface of the hub 76. The fisherman can thus so adjust the frictional resistance to the rotation of the spool that the line will not pay out unless the force exerted thereon is in excess of a predetermined minimum.

Figures 16, 17:
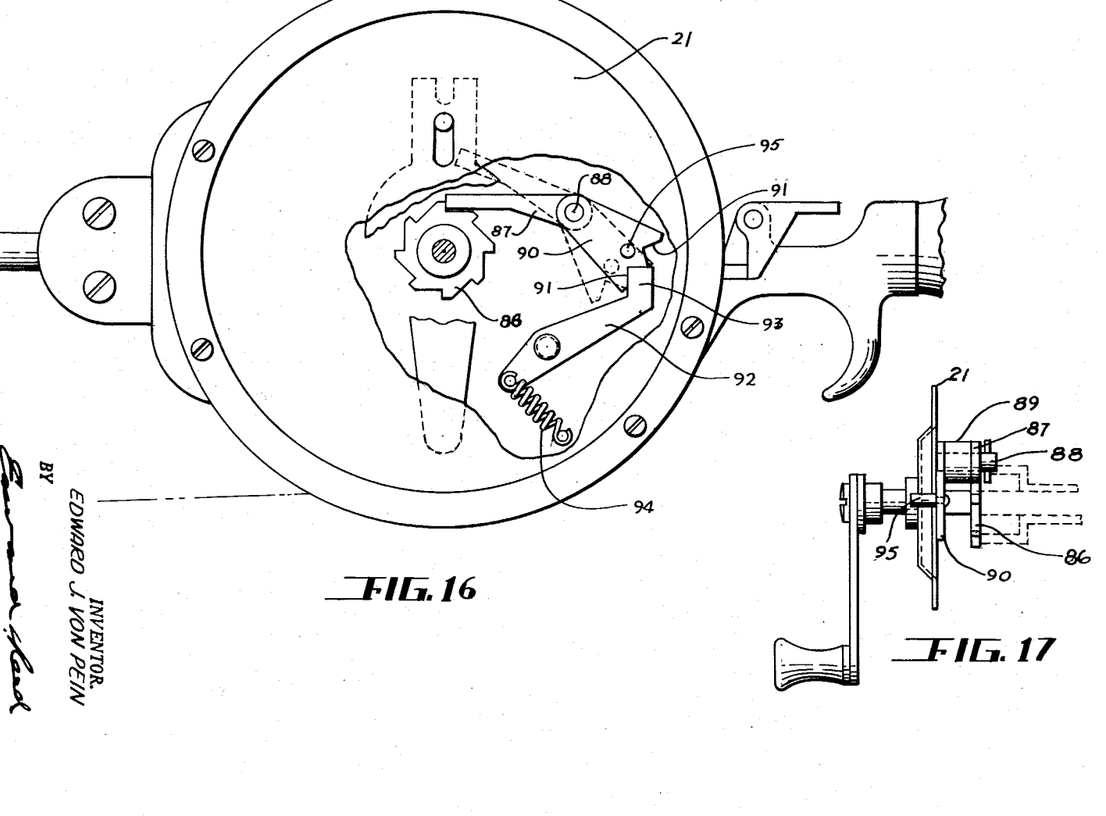
Fig. 16 is a side elevation of the reel of Fig. 9, partly broken away, to show a locking device.
Fig. 17 is a side view of the locking device of Fig. 16.

In order that the friction clutch may yieldably resist the paying out of the line the tubular member must be held against rotation with the spool as by clutching the same to the shaft, the rotation of the shaft being controlled by the fisherman. Under some conditions of fishing it is desirable that the fishing rod be mounted on a support in a position in which the fisherman has no control over the rotation of the shaft, as for example, in trolling from a boat. To enable this to be done, there is provided means whereby the tubular element may be locked against rotation, thus rendering the friction clutch effective. As best shown in Fig. 16 there is mounted on the large diameter portion of the tubular member a ratchet wheel 86. Supported on the side member 21 of the frame is a pawl 87 carried by a pin 88 which is rotatable in a bearing 89 mounted on the side member of the frame. Rigidly secured to the pin 88 is an arm 90 extending from the pin in a direction opposite the direction of the pawl 87 and having in its free end two V-shaped notches 91. A yieldable detent, such as the pivoted arm 92, is provided with a nose portion 93 adapted to enter either of the recesses 91 in the arm 90, a spring 94 urging the detent toward the notches. When the detent is in the lower notch 91 the nose of the pawl is held in engagement with the ratchet wheel to prevent the rotation of the latter in a direction to unwind the line. The spool can, however, be rotated in a direction to wind in the line, because the pressure of the ratchet teeth on the pawl as the ratchet wheel rotates will cause the inclined wall of the lower notch 91 in the arm 90 to press the nose of the detent 92 outwardly and thus permit the nose of the pawl to rise far enough as to permit the ratchet teeth to move past the same, but the detent will not be moved outwardly far enough to disengage it from the notch in arm 90. When it is desired to retain the pawl in an inoperative position the arm 90 is moved downwardly, as by a stud 95, to force the detent out of the lower notch 91 and cause it to enter the upper notch 91. The stud extends through a slot in the side wall, not shown, so that it can be easily operated.

The reel is provided with the usual "click" which is here shown as comprising a toothed disk 96 rigidly secured to the hub 76 of the spool and having V-shaped teeth. A pawl 97 pivotally mounted at 98 on the side member 20 of the frame engages the toothed disk and is controlled by the notched arm 99 and a spring pressed detent 100 in substantially the same manner as is the ratchet wheel lock except that the nose 101 of the pawl is shaped so that it can readily ride over the teeth when the toothed disk is rotated and thus produce the desired sound, and also offer some resistance to the rotation of the spool.

This form of the reel is also provided with a thumbing brake comprising a brake drum 102, a brake shoe 103, and an actuating lever 104 similar to those described.

While I have shown and described one embodiment of my invention I wish it to be understood that I do not desire to be limited to the details thereof as various modifications may occur to a person skilled in the art.

I claim:

1. In a fishing reel, a frame, a shaft mounted on said frame for both axial movement and rotary movement, a spool supported on said frame for rotation about the axis of said shaft and held against axial movement, means for rotating said shaft and for imparting axial movement thereto, a clutch member rotatably supported on said shaft and connected with said spool for rotation therewith and for axial movement with relation thereto, means for yieldably retaining said clutch member in a normal axial position, and a second clutch member rigid with said shaft and having a part movable into interlocking engagement with the first mentioned clutch member by the movement of said shaft.

2. In a fishing reel, a frame, a shaft mounted on said frame for both axial movement and rotary movement, a tubular member rotatably supported on said shaft, a spool connected with said tubular member for rotation therewith, a clutch member slidably mounted on said shaft within said tubular member and connected with the latter for rotation therewith, a clutch member rigid with said shaft and movable thereby into clutching engagement with the first mentioned clutch member, said clutch members having cooperative recesses and projections and spring means in said tubular member to yieldably retain said first mentioned clutch member in clutching position.

3. In a fishing reel, a frame comprising side members, a shaft supported on said side members for both rotary movement and axial movement, means for imparting said movements to said shaft, a spool rotatably supported on said shaft between said side members, a clutch member supported about said shaft and connected with said spool, a second clutch member secured to said shaft and movable thereby into and out of clutching engagement with the first mentioned clutch member, and a device mounted on said frame and having a part movable transversely to said shaft into and out of the path of movement of said second clutch member, said part being yieldable under axial pressure thereon to release said second clutch member for axial movement by said shaft to clutching position and being manually operable to release said clutch member for movement to declutching position.

4. In a fishing reel, a frame comprising side members, a shaft supported on said side members for both rotary movement and axial movement, means for imparting said movements to said shaft, a spool rotatably supported on said shaft between said side members, a clutch member supported about said shaft and connected with said spool, a second clutch member secured to said shaft and movable thereby into and out of clutching engagement with the first mentioned clutch member, and a device mounted on said frame and having a part movable into and out of the path of axial movement of the clutch member on said shaft in either direction, means for retaining said part of said device in the path of said clutch member, said means being yieldable to permit said clutch member to move past said part of said device in one direction and to then move said part into the path of movement of said clutch member in the other direction.

5. In a fishing reel, a frame comprising side members, a shaft supported on said side members for both rotary movement and axial movement, means for imparting said movements to said shaft, a spool rotatably supported on said shaft between said side members, a clutch member supported about said shaft and connected with said spool, a second clutch member secured to said shaft and movable thereby into and out of clutching engagement with the first mentioned clutch member, a clutch controlling member mounted on the side member of said frame which is adjacent said second clutch member, said controlling member being movable transversely to said shaft and having a part movable into the path of said second clutch member on either side of the latter, spring means acting on said controlling member to yieldably retain said part in the path of said second clutch member when the latter is at one limit of its movement, said part being movable out of said path of said second clutch member by axial pressure on the latter and being movable by said spring means into the path of said second clutch member when the latter is moved to the other limit of its movement.

6. In a fishing reel, a frame comprising side members, a shaft supported on said side members for both rotary movement and axial movement, means for imparting said movements to said shaft, a spool rotatably supported on said shaft between said side members, a clutch member supported about said shaft and connected with said spool, a second clutch member secured to said shaft and movable thereby into and out of clutching engagement with the first mentioned clutch member, a plate slidably mounted on one of said side members extending across said shaft having an opening through which said second clutch member may move, said plate also having an inclined lip at the edge of said opening, and spring means acting on said plate to retain said lip in the path of said second clutch member when the latter is in declutching position, to yield under pressure exerted on said lip by said second clutch member and to again move said lip into the path of said second clutch member when the latter has been moved past said lip.

7. In a fishing reel, a frame comprising side members, a shaft supported on said side members for both rotary movement and axial movement, means for imparting said movements to said shaft, a spool rotatably supported on said shaft between said side members, a clutch member supported about said shaft and connected with said spool, a second clutch member secured to said shaft and movable thereby into and out of clutching engagement with the first mentioned clutch member, a plate slidably mounted on one of said side members extending across said shaft having an opening through which said second clutch member may move, said plate also having an inclined lip at the edge of said opening, and spring means acting on said plate to retain said lip in the path of said second clutch member when the latter is in declutching position, to yield under pressure exerted on said lip by said second clutch member and to again move said lip into the path of said second clutch member when the latter has been moved past said lip, and manually operated means to move said lip out of said path to permit the movement of said second clutch member to declutching position.

8. In a fishing reel, a frame comprising side members, a shaft supported on said side members for both rotary movement and axial movement, a tubular member rotatably supported on said shaft between said side members and having an enlarged portion, a spool connected with said tubular member for rotation therewith, a clutch member rotatably supported on said shaft within the enlarged portion of said tubular member and having recesses in the outer end thereof, means for connecting said clutch member with said tubular member for rotation therewith and for axial movement with relation thereto, a second clutch member rigidly secured to said shaft and having projections movable by said shaft into and out of the recesses in the first mentioned clutch member, spring means urging said first mentioned clutch member towards said second clutch member, a device mounted on said frame and having a part movable into and out of the path of said second clutch member, spring means retaining said device normally in said path, said part being yieldable to permit said second clutch member to move past the same, and handles connected with the respective ends of said shaft to impart both rotary movement and axial movement to said shaft.

9. In a fishing reel, a frame, a shaft mounted on said frame for both rotary movement and axial movement, a tubular member rotatably supported on said shaft, a spool connected with said tubular member for rotation therewith, a clutch member rotatably mounted on said shaft within said tubular member and connected with the latter for rotation therewith, a second clutch member secured to said shaft and movable thereby into and out of engagement with the first mentioned clutch member, a device mounted on said frame for movement transversely to said shaft and having a part to retain said second clutch member in either its clutching position or its declutching position, spring means urging said part toward retaining position, said part yielding under pressure on said shaft to release said second clutch member for movement in one direction, and manually operable means for retracting said part to permit the movement of said clutch member in the other direction.

10. In a fishing reel, a frame, a shaft mounted on said frame for both rotary movement and axial movement, a tubular member rotatably supported on said shaft, a spool connected with said tubular member for rotation therewith, a clutch member rotatably mounted on said shaft within said tubular member and connected with the latter for rotation therewith, a second clutch member secured to said shaft and movable thereby into and out of engagement with the first mentioned clutch member, a device mounted on said frame for movement transversely to said shaft and having a part to retain said second clutch member in either its clutching position or its declutching position, spring means urging said part toward retaining position, said part yielding under pressure on said shaft to release said second clutch member for movement in one direction, and manually operable means for retracting said part to permit the movement of said clutch member in the other direction, said device having a second part movable by said manually operable means into engagement with said tubular member to retard the rotation of said spool.

11. In a fishing reel, a frame, a shaft supported on said frame for both rotary movement and axial movement, means for imparting both movements to said shaft, a tubular member rotatably supported on said shaft, a spool rotatably supported on said tubular member, a frictional connection between said tubular member and said spool and clutch means operable by the axial movement of said shaft to connect the latter with and disconnect the same from said tubular member.

12. In a fishing reel, a frame, a shaft supported on said frame for both rotary movement and axial movement, means for imparting both movements to said shaft, a tubular member rotatably supported on said shaft, a spool rotatably supported on said tubular member, a frictional connection between said tubular member and said spool, a clutch member rotatable on said shaft and connected with said tubular member for rotation therewith, and a second clutch member secured to said shaft and movable by said shaft into driving connection with the first mentioned clutch member.

13. In a fishing reel, a frame, a shaft supported on said frame for both rotary movement and axial movement, means for imparting both movements to said shaft, a tubular member rotatably supported on said shaft, a spool rotatably supported on said tubular member, a frictional connection between said tubular member and said spool, a clutch member rotatable on said shaft and connected with said tubular member for rotation therewith and a second clutch member secured to said shaft and movable by said shaft into driving connection with the first mentioned clutch member, and means for adjusting said tubular member lengthwise of said shaft to vary the frictional resistance to the relative movements of said spool and said tubular member.

14. In a fishing reel, a frame, a shaft supported on said frame for both rotary movement and axial movement, means for imparting both movements to said shaft, a tubular member rotatably supported on said shaft, means controlled by the axial movement of said shaft for connecting said tubular member with said shaft for rotation therewith, a spool rotatably supported on said tubular member and including a part having a friction surface, a friction element secured to said tubular element in opposed relation to said friction surface, and means for imparting axial movement to said tubular member to adjust said friction element with relation to said friction surface.

15. In a fishing reel, a frame, a shaft supported on said frame for both rotary movement and axial movement, means for imparting both movements to said shaft, a tubular member rotatably supported on said shaft, means controlled by the axial movement of said shaft for connecting said tubular member with said shaft for rotation therewith, a spool rotatably supported on said tubular member and including a part having a friction surface, a friction element mounted about said tubular element in opposed relation to said friction surface, a resilient disk mounted about said tubular member and connected thereto for rotation therewith, means for connecting the peripheral portion of said resilient disk with said friction element for rotation therewith and to press the same against said friction surface, and means for adjusting said tubular element lengthwise of said shaft to vary the pressure of said friction element on said friction surface.

16. In a fishing reel, a frame, a shaft supported on said frame for both rotary movement and axial movement, means for imparting both movements to said shaft, a tubular member rotatably supported on said shaft, a spool rotatably supported on said tubular member, a frictional connection between said tubular member and said spool, clutch means operable by the axial movement of said shaft to connect the latter with and disconnect the same from said tubular member, a ratchet wheel secured to said tubular member, a pawl mounted on said frame, and means for retaining said pawl in operative engagement with said ratchet wheel or in inoperative relation thereto.

17. In a fishing reel, a frame, a shaft supported on said frame for both rotary movement and axial movement, means for imparting both movements to said shaft, a tubular member rotatably supported on said shaft, a spool rotatably supported on said tubular member, a frictional connection between said tubular member and said spool, clutch means operable by the axial movement of said shaft to connect the latter with and disconnect the same from said tubular member, a ratchet wheel secured to said tubular member, a pawl mounted on said frame, and yieldable means for retaining said pawl in a position to lock said ratchet wheel against rotation in one direction while permitting the rotation thereof in the other direction, or in inoperative position.

18. In a fishing reel, a frame, a shaft supported on said frame for both rotary movement and axial movement, means for imparting both movements to said shaft, a tubular member rotatably supported on said shaft, a spool rotatably supported on said tubular member, a frictional connection between said tubular member and said spool, clutch means operable by the axial movement of said shaft to connect the latter with and disconnect the same from said tubular member, a ratchet wheel secured to said tubular member, a pawl pivotally mounted on said frame, an arm rigid with said pawl and having spaced notches in the free end thereof, a yieldable detent mounted on said frame and having a part arranged to enter either of said notches in said arm, and means for moving said arm to position either of said notches in line with said detent.

EDWARD J. VON PEIN.

REFERENCES CITED

The following references are of record in the file of this patent:

UNITED STATES PATENTS

| Number | Name | Date |
|---|---|---|
| 220,776 | Wardwell, Jr. | Oct. 21, 1879 |
| 778,244 | Howard | Dec. 27, 1904 |
| 1,730,332 | Pflueger | Oct. 1, 1929 |
| 1,952,756 | Henze | Mar. 27, 1934 |
| 2,176,247 | Coxe | Oct. 17, 1939 |
| 2,180,566 | Thompson | Nov. 21, 1939 |
| 2,329,381 | Bannister | Sept. 14, 1943 |
| 2,380,213 | Boor | July 10, 1945 |
| 2,399,863 | Foresteire, Sr. | May 7, 1946 |
| 2,417,732 | Bland et al. | Mar. 18, 1947 |

FOREIGN PATENTS

| Number | Country | Date |
|---|---|---|
| 1,631 of 1907 | Great Britain | Jan. 22, 1908 |
| 6,779 of 1910 | Great Britain | Feb. 23, 1911 |